(12) United States Patent  
Sogani et al.

(10) Patent No.: US 9,172,952 B2
(45) Date of Patent: Oct. 27, 2015

(54) METHOD AND SYSTEM FOR ANALYZING VIDEO STREAM ACCURACY IN A NETWORK ENVIRONMENT

(75) Inventors: Deepti Sogani, Fremont, CA (US); Oleg Todresovich Ferdman, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 554 days.

(21) Appl. No.: 13/532,389

(22) Filed: Jun. 25, 2012

(65) Prior Publication Data

US 2013/0343467 A1 Dec. 26, 2013

(51) Int. Cl.
H04N 7/12 (2006.01)
H04N 17/00 (2006.01)
G06T 7/00 (2006.01)

(52) U.S. Cl.
CPC ............ *H04N 17/004* (2013.01); *G06T 7/0002* (2013.01); *G06T 2207/10016* (2013.01); *G06T 2207/30168* (2013.01); *G06T 2207/30208* (2013.01)

(58) Field of Classification Search
USPC .................................................... 375/240.25
See application file for complete search history.

(56) References Cited

U.S. PATENT DOCUMENTS

| | | | |
|---|---|---|---|
| 5,726,435 A | 3/1998 | Hara et al. | |
| 6,356,661 B1 * | 3/2002 | Wen | 382/233 |
| 6,511,280 B1 * | 1/2003 | Sammartino et al. | 414/784 |
| 6,871,180 B1 * | 3/2005 | Neuhauser et al. | 704/500 |
| 2003/0009722 A1 * | 1/2003 | Sugiyama et al. | 714/779 |
| 2005/0211782 A1 * | 9/2005 | Martin et al. | 235/462.45 |
| 2013/0265445 A1 * | 10/2013 | Argyropoulos et al. | 348/192 |
| 2013/0284801 A1 * | 10/2013 | Meier et al. | 235/375 |

OTHER PUBLICATIONS

QR Code Features—QR Code.com [retrieved and printed from the Internet May 14, 2012], 2 pages; http://www.denso-wave.com/qrcode/qrfeature-e.html.

Wikipedia, the free encyclopedia, "QR Code," [retrieved and printed from the Internet May 14, 2012], 12 pages; http://en.wikipedia.org/wiki/Qr_code.

Zxing, "Multi-format 1D/2D barcode image processing library with clients for Android, Java," com [retrieved and printed from the Internet Jun. 18, 2012], 2 pages; http://code.google.com/p/zxing/.

\* cited by examiner

*Primary Examiner* — Tracy Li
(74) *Attorney, Agent, or Firm* — Patent Capital Group (57) ABSTRACT

A method is provided in one example and includes receiving a video sequence having at least one code symbol embedded therein. The at least one code symbol is selected from a sequence of code symbols. The method further includes determining whether the at least one code symbol is decodable, and determining one or more video quality parameters based upon whether the at least one symbol is decodable. The method still further includes determining a video quality metric associated with the video sequence based upon the one or more video quality parameters.

15 Claims, 8 Drawing Sheets

METHOD AND SYSTEM FOR ANALYZING VIDEO STREAM ACCURACY IN A NETWORK ENVIRONMENT

TECHNICAL FIELD

This disclosure relates in general to the field of communications and, more particularly, to analyzing video stream accuracy in a network environment.

BACKGROUND

Unlike analog video, the quality of digital video is influenced by many parameters such as the codec, resolution, and frame rate used to quantify the video. Such variability presents significant challenges in defining video accuracy and in tracking video streams from a source, such as a camera, to a viewer with adequate precision. Determining the quality of streamed digital video is often not amenable to automated testing procedures. Systems that operate on digital video are often validated manually by the subjective measure of a tester. These tasks are inherently time consuming and prone to errors. In addition, traditional objective video quality measurement metrics do not necessarily correlate with an end user experience.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example and includes receiving a video sequence having at least one code symbol embedded therein. The at least one code symbol is selected from a sequence of code symbols. The method further includes determining whether the at least one code symbol is decodable, and determining one or more video quality parameters based upon whether the at least one symbol is decodable. The method still further includes determining a video quality metric associated with the video sequence based upon the one or more video quality parameters. In more particular embodiments, the video quality parameters include one or more of a duration of distortions in the video sequence, a duration of freezes in the video sequence, and a duration of jumps in the video sequence. In some particular embodiments, determining the video quality metric includes summing the duration of distortions in the video sequence, the duration of freezes in the video sequence, and the duration of jumps in the video sequence, and dividing the summation of distortions, freezes, and jumps by a total length of the video sequence.

In still more particular embodiments, determining one or more video quality parameters based upon whether the at least one symbol is decodable includes determining that distortion has occurred in the video sequence if the at least one symbol is not decodable. In still other particular embodiments, determining whether the at least one code symbol is decodable includes decoding a first code symbol embedded within the video sequence, decoding a second code symbol embedded within the video sequence, and determining that a freeze has occurred in the video sequence if the first code symbol is the same as the second code symbol and an expected display time of the first code symbol within the sequence of code symbols has been exceeded.

In still more particular embodiments, determining whether the at least one code symbol is decodable includes decoding a first code symbol embedded within the video sequence, decoding a second code symbol embedded within the video sequence, and determining that a jump has occurred in the video sequence if the first code symbol is different from the second code symbol and the second code symbol is not the expected code symbol within the sequence of code symbols. In still more particular embodiments, the at least one code symbol is a matrix code symbol.

Example Embodiments

Figure 1:
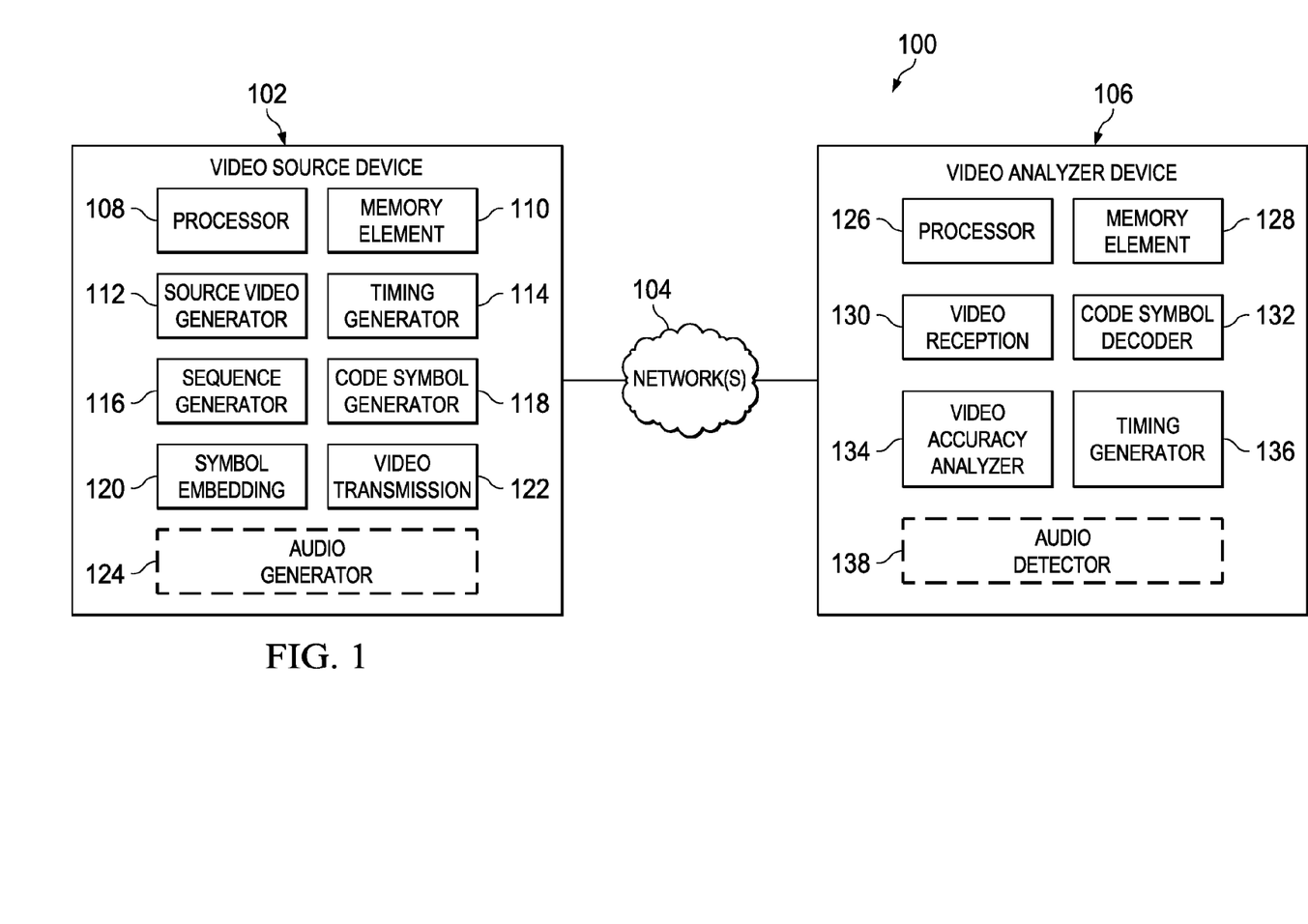
FIG. 1 is a simplified block diagram of a communication system for analyzing video stream accuracy in a network environment in accordance with one embodiment of the present disclosure.

Referring now to FIG. 1, FIG. 1 is a simplified block diagram of a communication system 100 for analyzing video stream accuracy in a network environment in accordance with one embodiment of the present disclosure. Communication system 100 includes a video source device 102 in communication with one or more network(s) 104, and a video analyzer device 106 also in communication with network(s) 104. Video source device 102 includes a processor 108, a memory element 110, a source video generator module 112, a timing generator module 114, a sequence generator module 116, a code symbol generator module 118, a symbol embedding module 120, and a video transmission module 122. Video source device 102 may optionally further include an audio generator module 124. Video analyzer device 106 includes a processor 126, a memory element 128, a video reception module 130, a code symbol decoder module 132, a video accuracy analyzer module 134, and a timing generator module 136. Video analyzer device 106 may optionally further include an audio detector module 138.

Network(s) 104 may include one or more communication networks to facilitate communication between the various components of communication system 100. In at least one embodiment, network(s) 104 may include one or more of a packet-based network, such as the Internet, a wireless network, and a cellular-based network. In one particular instance, communication system 100 can be associated with a service provider digital subscriber line (DSL) deployment. In other examples, communication system 100 would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 may also operate in conjunction with a user datagram protocol/IP (UDP/IP) or any other suitable protocol, where appropriate and based on particular needs.

In accordance with the teachings of the present disclosure, communication system 100 is configured for embedding, or overlaying, code symbols within a video stream or video sequence in a predefined order by video source device 102 and then decoding/analyzing the code symbols by video analyzer device 106. In various embodiments, the code symbols are human-perceptible code symbol that are visually perceptible to a human. In still other embodiment, the code symbols may not necessarily be perceptible by a human. In at least one embodiment, the code symbols are two-dimensional (2-D) code symbols that are configured to encode a predetermined sequence of alphanumeric characters. In a particular embodiment, the code symbols are Quick Response (QR) codes as developed by Denso Wave. A QR code is a matrix code symbol comprised of black modules arranged in a square pattern. The information encoded within the QR code is made up of alpha numeric characters, which represent a value from a sequence of predetermined values.

In a particular embodiment, a video stream or video sequence including matrix codes in the form of QR codes is provided to a source and streamed to a video consumption site. In some embodiments, the video stream or video sequence may be provided from a camera or other video source. The QR codes are then decoded and analyzed at the video consumption site. In various embodiments, the video of QR codes is provided by video source device 102, and the decoding and analysis of the QR codes in performed by video analyzer device 106. In at least one embodiment, a custom golden video stream is compiled from QR code images in a predefined sequential order. In a particular embodiment, at the video publisher site where the video stream is available for viewing, video analyzer device 106 decodes the QR images at a configurable frequency, such as every 33 ms, while realtime streaming is in progress. Video analyzer device 106 then determines a video quality metric associated with the video sequence based upon whether one or more of the code symbols is decodable. In particular embodiments, video analyzer device 106 determines an overall video accuracy score of the video as a video quality metric based upon the decoded QR images.

In various embodiments, an overall video accuracy score is computed from decoding and analysis of code symbols embedded within a video sequence or video stream based upon one or more video quality parameters, which may include video jumps, freezes, and distortions determined from received code symbols, such as QR codes. A jump in video is detected when one or more QR code(s) is found missing in the expected sequence of codes. A freeze is detected when the same QR code is continuously scanned for more than the QR code's expected display time. The video is reported as distorted when a QR code cannot be scanned (decoded). In various embodiments, an Overall Video Accuracy (OVA) percentage is calculated using the duration of the failure in each reported category including jumps, freezes and distortion according to the following formula: 100%−(((Sum [jump]+Sum[freeze]+Sum [distortion])/total video length)× 100%). The Overall Video Accuracy Score (OVAS) is assigned to the video under test based on the OVA calculation.

Still referring to FIG. 1, video source device 102 is configured to embed code symbols within a video stream in a predefined order and transmit the coded video stream to video analyzer device 106. In particular embodiments, video source device 102 may be a computer, a camera, server, or any other suitable device configured to either receive and/or generate source video and embed one or more code symbols therein. Source video generator module 112 is configured to generate source video to be used to determine the performance of network(s) 104 when used to transmit video streams between endpoints such as video source device 102 and video analyzer device 106. Timing generator module 114 is configured to generate timing signals used by video source device 102. These timing signals may include the time periods during which each code symbol of a code symbol sequence is to be transmitted within the video stream. Sequence generator module 116 is configured to generate values of a predetermined sequence. In a particular embodiment, the values of the predetermined sequence are numerical values between 0 and 599. In still other embodiments, the values of the predetermined sequence may be alphanumeric values or characters. Code symbol generator module 118 is configured to generate a code symbol from the current sequence value of the predetermined sequence. In a particular embodiment, code symbol generator module 118 is configured to generate a QR code that encodes the current value of the predetermined sequence. Symbol embedding module 120 is configured to embed the current code symbol within the current frame of the source video. In a particular embodiment, symbol embedding module 120 overlays the current code symbol in the current frame of the video stream. Video transmission module 122 is configured to transmit the coded video stream to network(s) 104. In some embodiments, audio generator module 124 is configured to generate an audio signal such as a tone, and embed the audio signal within the video stream as will be further described herein.

Video analyzer device 106 configured to receive the coded video stream, decode the code symbols embedded therein, and analyze the video stream accuracy based upon the decoded code symbols. In various embodiments, video analyzer device 106 is any device configured to receive a video stream, decode code symbols embedded therein, and analyze the accuracy of the video stream based on the decoded code symbols. In particular embodiments, video analyzer device 106 may include a personal computer, a handheld device such as a smart phone, a server, a video display device, or any other suitable device. In addition, although video analyzer device 106 is illustrated as being at an endpoint, in other embodiments video analyzer device 106 may be located at any location within network(s) 104 in which it is desired to test the accuracy of a video stream passing therethrough. Video reception module 130 is configured to receive the video stream transmitted by video source device 102. Code symbol decoder 132 is configured to decode the code symbol embedded within a frame of the video stream. Video accuracy analyzer module 134 is configured to analyze the accuracy of the video stream based on the decoded code symbols.

In various embodiments, video accuracy analyzer module 134 is configured to determine when a code symbol has been properly received in addition to determining whether distortion, a freeze, or a jump has occurred in the video stream. Video accuracy analyzer module 134 is further configured to compute an overall video accuracy score based upon the length of any jumps, freezes or distortion compared to the total video length. Timing generator module 136 is configured to generate various timing signals used by video analyzer device 106. For example, timing generator module 136 is configured to generate a timing signal to determine when each coded symbol within the video stream is expected to occur. For example, in a particular embodiment video analyzer device 106 is configured to decode the code symbols at a configurable frequency, such as every 33 ms. In some embodiments, audio detector module 138 is configured to detect the presence of an audio signal embedded within the video stream.

Figure 2:
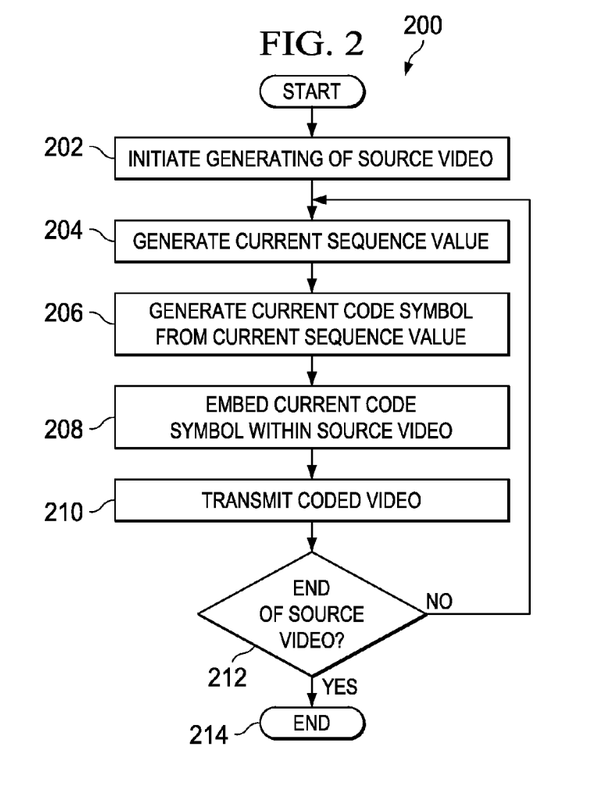
FIG. 2 is a simplified flowchart of a procedure for embedding a code symbol within a source video in accordance with one embodiment of the present disclosure.

Referring now to FIG. 2, FIG. 2 is a simplified flowchart of a procedure 200 for embedding a code symbol within a source video in accordance with one embodiment of the present disclosure. In various embodiments, procedure 200 is performed by video source device 102. In 202, source video generator module 112 of video source device 102 initiates generating of source video. In at least one embodiment, the source of video may be a video stream or video sequence comprised of a plurality of blank frames. In still other embodiments, the source video may be comprised of a video stream having program content or other content therein. In 204, sequence generator module 116 generates a current sequence value from a predetermined sequence. In a particular embodiment, the predetermined sequence is comprised of numbers from 0 to 599 which are chosen sequentially and which cycled back to a value of 0 after the value of 599 is used. In still other embodiments, the previous or current sequence may consist of a range of alphanumeric characters such as a, b, c, d, e, f, g, h, etc. In still other embodiments, the predetermined sequence may not necessarily include a sequential series of values and instead may include any desired pattern of values or characters. In 206, code symbol generator module 118 generates a current code symbol from the current sequence value. In a particular embodiment, code symbol generator module 118 generates a QR code that encodes the current sequence value. In 208, symbol embedding module 120 embeds the current code symbol within the current frame of the source video as part of the video image.

Figure 3:
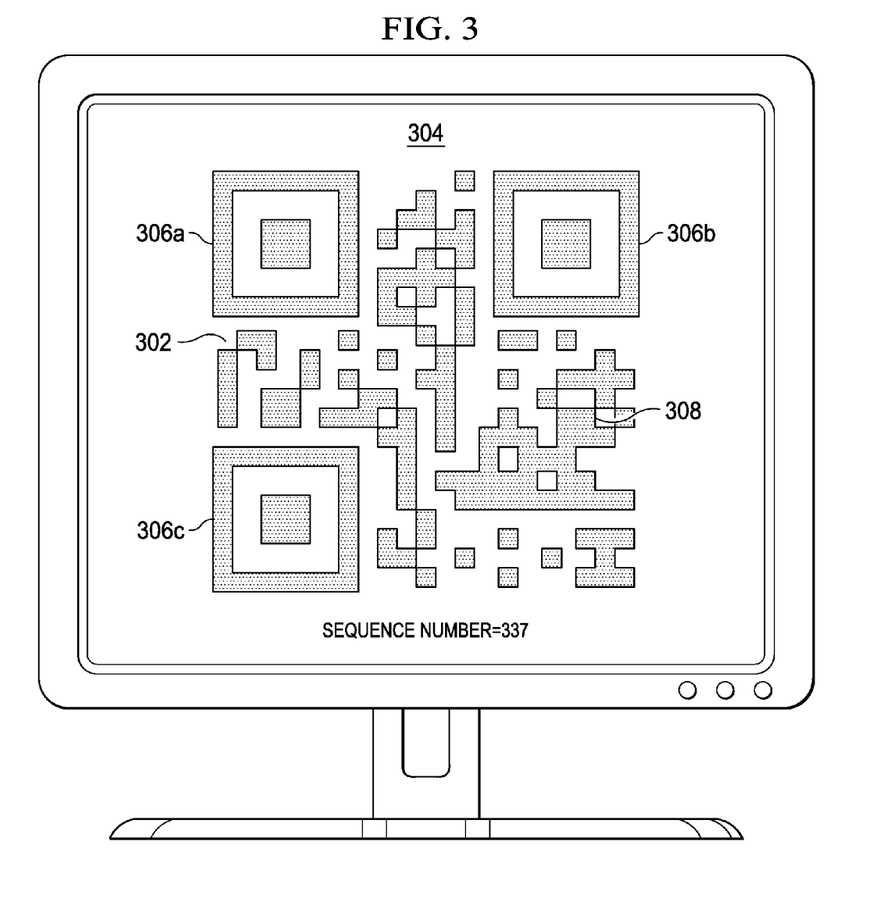
FIG. 3 is a simplified diagram illustrating an example of a code symbol embedded in a source video in accordance with an embodiment of the present disclosure.

Referring now to FIG. 3 is a simplified diagram illustrating an example of a code symbol 302 embedded as part of an image in a source video 304 in accordance with an embodiment of the present disclosure. In the particular embodiment illustrated in FIG. 3, the code symbol 302 is a QR code having a sequence number of 337 encoded therein. The code symbol 302 includes alignment squares 306a, 306b, and 306c used by a code symbol decoding algorithm to orient the code symbol 302 during decoding. The code symbol 302 further includes a data portion 308 that includes the encoded information as well as additional error correction information. In particular embodiments, a QR code uses a Reed-Solomon error correction algorithm that enables a particular QR code to be decodable despite a small amount of distortion occurring within a received QR code. However, if a significant amount of distortion occurs within the QR code, the QR code will no longer be decodable. In the embodiment illustrated in FIG. 3, the video frame 304 is shown as having one code symbol 302 embedded therein. In still other embodiments, one or more QR codes may be embedded within a single video frame. For example in particular embodiments, between four and sixteen QR codes may be embedded within a single video frame.

Referring again to FIG. 2, in 210 video transmission module 122 transmits the coded video stream over the network(s) 104. In 212, it is determined whether the end of the source video has occurred. If the end of the source video has not occurred, procedure 200 returns to 204 in which a current sequence value is again generated. It should be understood that in accordance with certain embodiments, a current code symbol is repeated within the frames of the source video for a predetermined time period until the next code symbol derived from the next value of the code sequence is generated and used for embedding within subsequent frames of the video. In a particular embodiment, the predetermined time period in which a code symbol is repeated is 132 ms. It should be understood that in various embodiments, the predetermined time period in which a code symbol is repeated is independent of the frame rate of the source video. For example for a source video having a frame rate of 30 frames/sec and a code symbol period of 132 ms, a code symbol will be repeated for four frames of the source video until a new code symbol is generated and applied to subsequent video frames of the source video.

Figure 4:
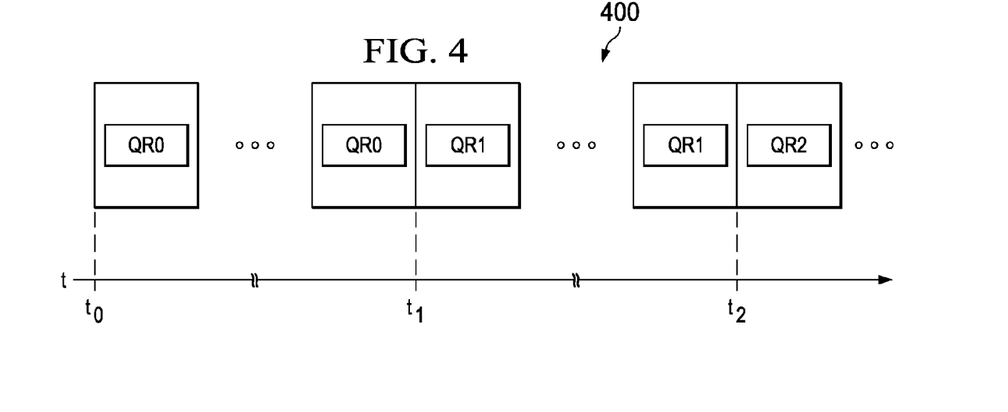
FIG. 4 is a simplified diagram of a source video sequence having code symbols embedded therein in accordance with an embodiment of the present disclosure.

Referring now to FIG. 4, FIG. 4 is a simplified diagram of a source video sequence 400 having code symbols embedded therein in accordance with an embodiment of the present disclosure. The source video sequence 400 includes a plurality of video frames each having a code symbol embedded therein. In the particular embodiment illustrated in FIG. 4, all frames of the source video sequence 400 transmitted between time $t_o$ and time $t_1$ have the code symbol QR0 embedded therein. Subsequent frames of the source video sequence 400 transmitted between time $t_1$ and time $t_2$ have the code symbol QR1 embedded therein. At time $t_2$, subsequent frames of the source video sequence 400 have code symbol QR2 embedded therein until the next predetermined period has elapsed. As long as source video sequence 400 continues to be transmitted, the embedded code symbol is changed each time the predetermined time period has elapsed. In particular embodiments, once the end of the sequence of code symbols has been reached, the sequence of code symbols is repeated beginning at the first code symbol of the sequence. Referring again to FIG. 2, if it is determined in 212 that the end of the source video has been reached, procedure 200 continues to 214. In 214, the procedure 200 ends. In other embodiments, 204 and 206 may be previously performed so that the code symbols are generated before receiving of the video stream or video sequence in which the code symbols are to be embedded.

Figure 5:
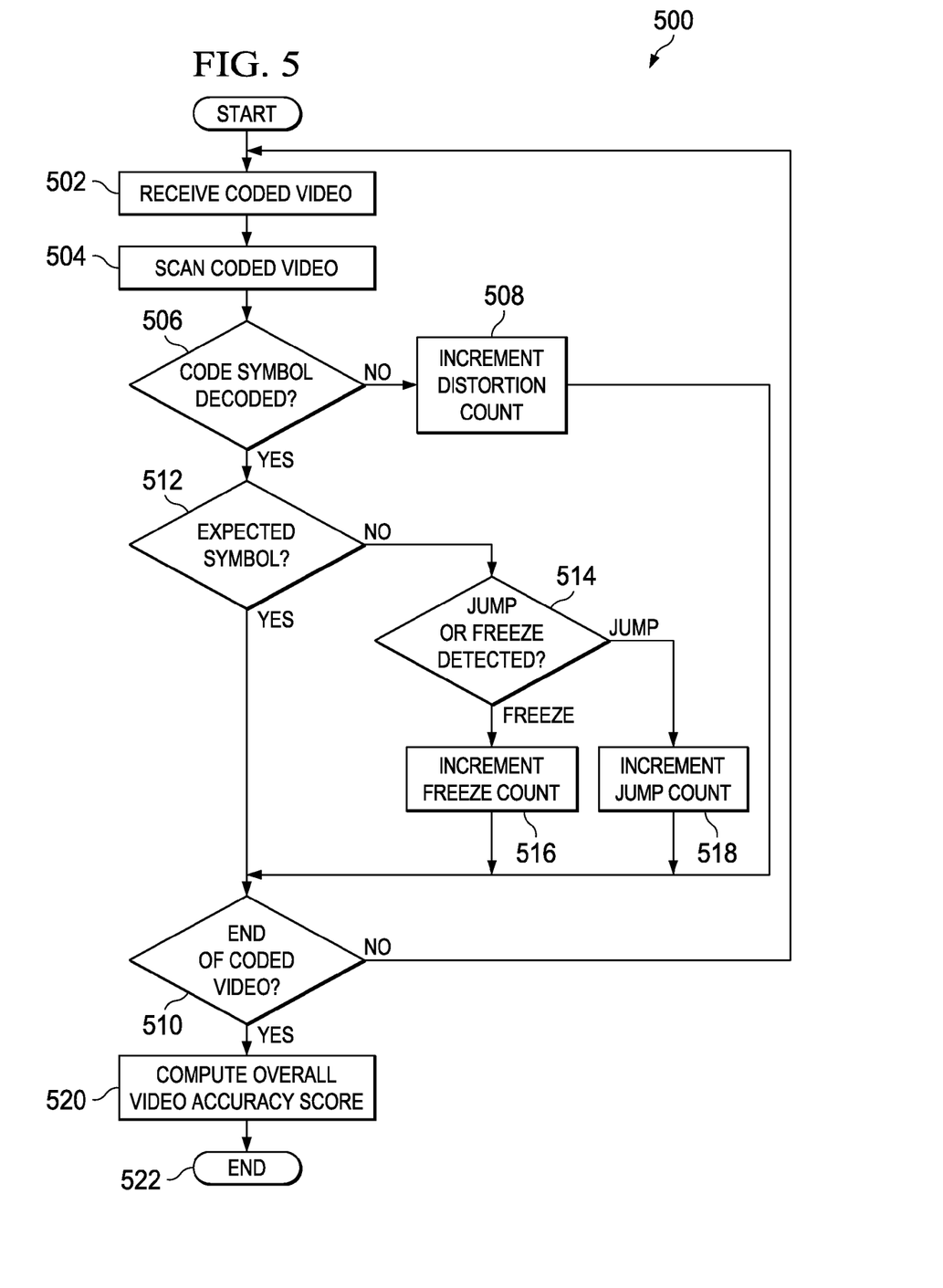
FIG. 5 is a simplified flowchart illustrating a procedure for analyzing a coded video stream for accuracy in accordance with an embodiment of the present disclosure.

FIG. 5 is a simplified flowchart illustrating a procedure 500 for analyzing a coded video stream for accuracy in accordance with an embodiment of the present disclosure. In various embodiments, procedure 500 is performed by video analyzer device 106. In 502, video reception module 130 of video analyzer device 106 receives a coded video stream having one or more code symbols embedded therein. In some embodiments, the one or more code symbols are embedded in the video stream using procedure 200 as described above with respect to FIG. 2. In still other embodiments, the code symbols may be embedded in the video stream using any other suitable procedure. In 504, code symbol decoder module 132 scans a frame of the coded video in order to detect any code symbols embedded therein. In 506, it is determined whether a code symbol within the frame of the video stream is decodable in which case the symbol decoder module 132 decodes the code symbol.

If it is determined in 506 that no code symbol has been decoded, code symbol decoder module 132 determines that distortion has occurred within the video stream that is severe enough to prevent decoding of the code symbol, and procedure 500 continues to 508. The distortion within the video stream may be due to a number of factors such as blocking or pixelation of the video, blurring of the video, image distortion of the video. Image distortion may include a number of different types of distortion such as stretching, compression, shrinking, or splitting of the video sequence. In 508, a distortion count for the coded video is incremented and procedure 500 continues to 510. In a particular embodiment, the distortion count is updated by the length of time in which the distortion occurs in the video sequence.

Figure 6A:
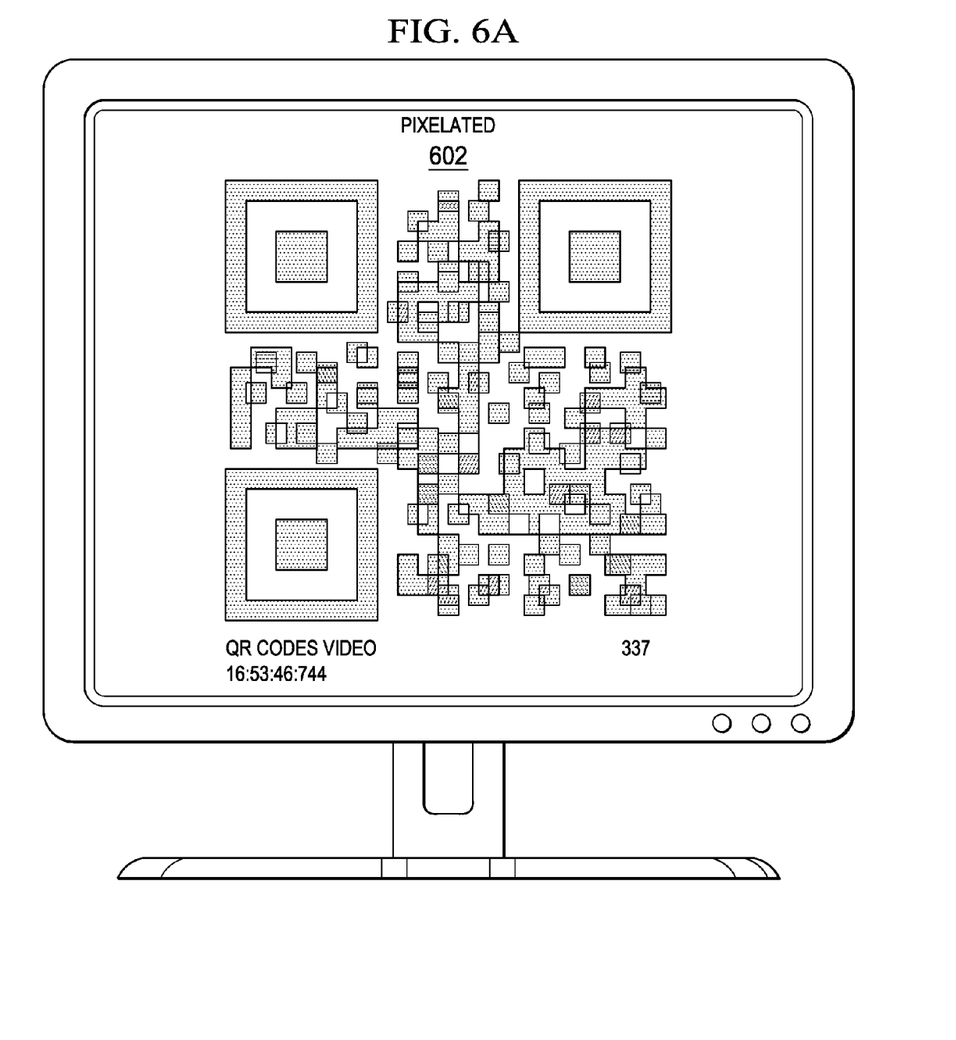
FIG. 6A illustrates an example of pixelated distortion in coded video.

Referring now to FIG. 6A, FIG. 6A illustrates an example of pixelated distortion in coded video 602. As can be seen in FIG. 6A, pixelation distortion has occurred in the coded video 602 to such an extent that the coded symbol cannot be decoded by code symbol decoder module 132. In a particular embodiment, a user of video analyzer device 106 may be provided with a display of the video frame including these distorted code symbol as well as additional information such as a time code of the portion of the video in which the distortion occurred as well as a an indication of the sequence value that was represented by the code symbol. As can be seen in the particular embodiment of FIG. 6B, a time code of 16:53:46:744 is provided to the user as well as an indication that the sequence value encoded in the code symbol is equal to 337 in the coded video 602. The user may use this additional information to aid in the testing and diagnostic procedures.

Figure 6B:
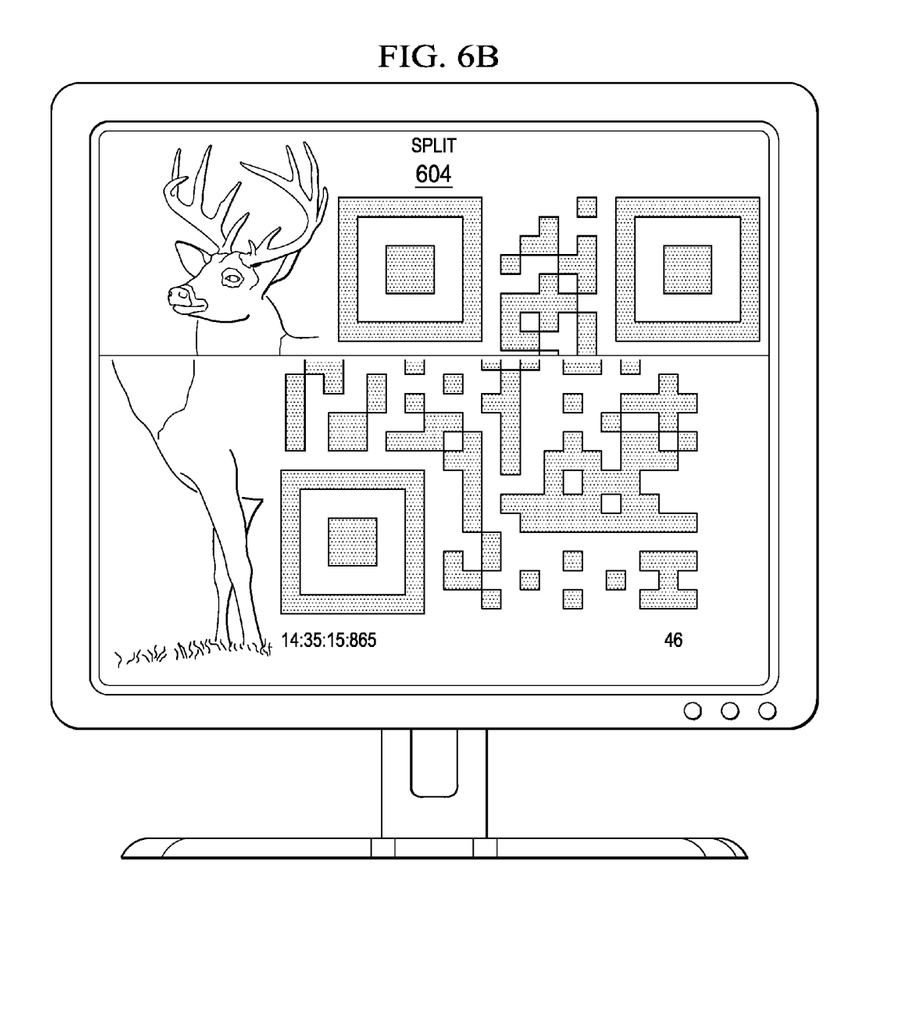
FIG. 6B illustrates an example of split distortion in coded video.

Referring now to FIG. 6B, FIG. 6B illustrates an example of split distortion in coded video 604. As can be seen in FIG. 6B, split distortion has occurred in the coded video 604 in which a portion of the coded video is shifted with respect to another portion such that the code symbol is split preventing decoding of the code symbol by code symbol decoder 132. The split in the coded video 604 illustrated in FIG. 6B has prevented decoding of the code symbol embedded therein. In the particular embodiment illustrated in FIG. 6B, a time code of 14:35:15:865 and a sequence value of 46 is displayed to the user of video analyzer device 106.

Figure 6C:
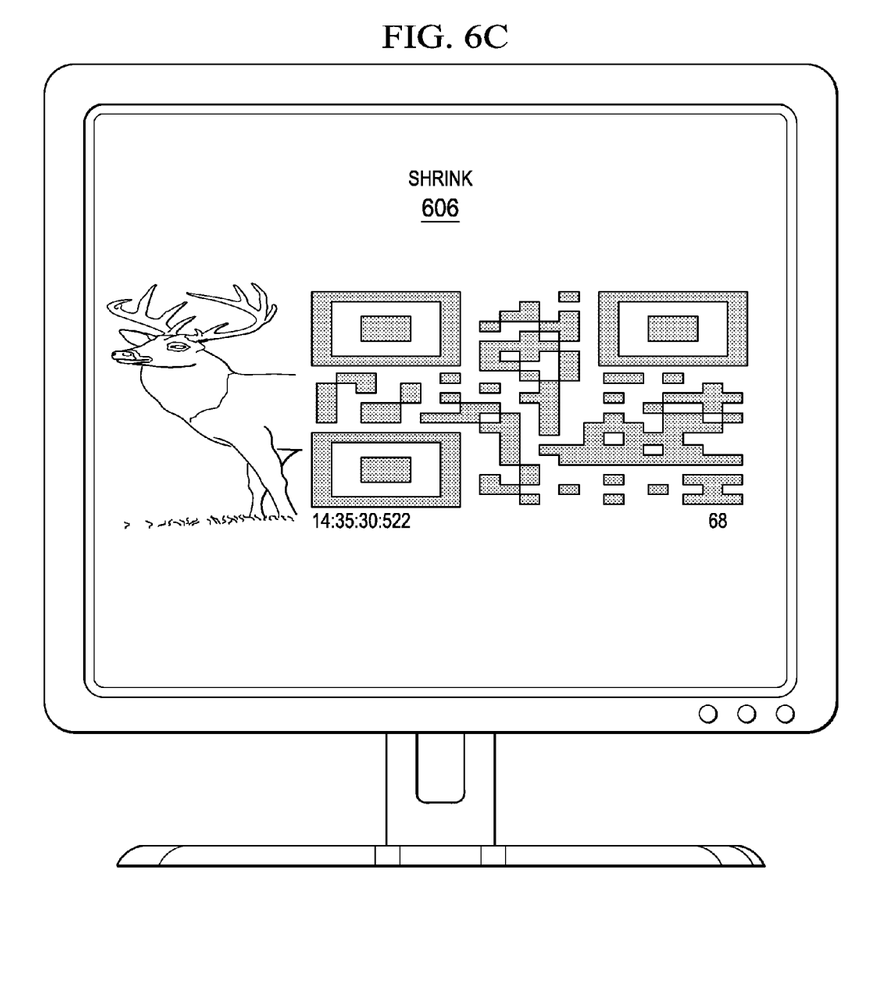
FIG. 6C illustrates an example of shrink/stretch distortion in coded video.

Referring now to FIG. 6C, FIG. 6C illustrates an example of shrink/stretch distortion in coded video 606. As can be seen in FIG. 6C, shrink distortion has occurred in the coded video 606 such that the aspect ratio of the coded video has been altered to the extent that the coded symbol embedded therein cannot be decoded by code symbol decoder module 132. In the particular embodiment illustrated in FIG. 6C, a time code of 14:35:30:522 as well as a sequence value of 68 is displayed to the user of video analyzer device 106.

Referring again to FIG. 5, if it is determined in 506 that a code symbol has been decoded, procedure 500 continues to 512. In 512, it is determined whether the decoded code symbol is the expected symbol for that particular time. If it is determined in 512 that the decoded code symbol is the expected symbol for that time, procedure 500 continues to 510. If it is determined in 512 that the decoded code symbol is not the expected symbol for that time, procedure 500 continues to 514. In 514, the video accuracy analyzer module 134 detects whether the determination that the decoded code symbol is not the expected code symbol for that time within the code symbol sequence is the result of either a jump or a freeze in the video stream. If a freeze is detected in 514, video accuracy analyzer module 134 increments a freeze count for the video stream in 516. In various embodiments, a freeze is detected when the same code symbol is continuously scanned for more than the code symbol's expected display time. Thus, in some embodiments if a first code symbol is the same as a second code symbol and an expected display time of the first code symbol has been exceeded, a freeze is determined to have occurred in the video stream or sequence. In a particular embodiment, the freeze count is updated by the length of time in which the freeze occurs in the video sequence. After 516, procedure 500 continues to 510.

Figure 7A:
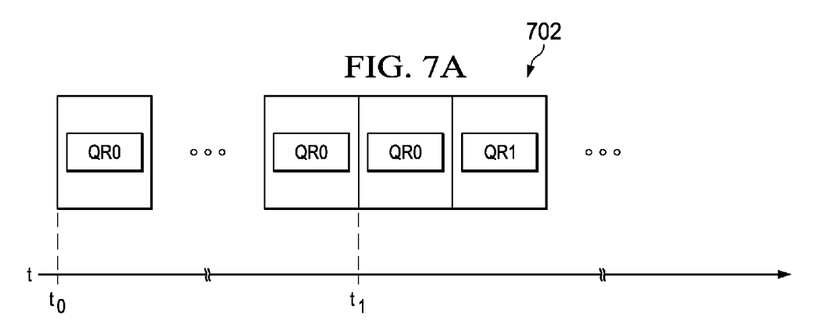
FIG. 7A illustrates an example of a freeze in a coded video sequence.

FIG. 7A illustrates an example of a freeze in a coded video sequence 702. In the example illustrated in FIG. 7A, video analyzer device 106 has received coded video sequence 702 having code symbol QR0 embedded in the frames received from time $t_o$ the next frame after time $t_1$. However, video accuracy analyzer module 134 of video analyzer device 106 expected the frame after time $t_1$ to include an embedded code symbol of QR1. As a result, video accuracy analyzer module 134 detects a freeze in the coded video sequence 702.

Referring again to FIG. 5, if a jump is detected in 514 by video accuracy analyzer module 134, video accuracy analyzer module 134 increments a jump count for the video stream in 518. In various embodiments, a jump is detected if a code symbol is found to be missing in the expected sequence of code symbols. For example, in a particular embodiment a jump is detected if a first code symbol and a second code symbol are decoded, the first code symbol is different from the second code symbol, and the second code symbol is not the expected code for that time within the sequence of code symbols. In a particular embodiment, the jump count is updated by the length of time in which the jump occurs in the video sequence. After 518, procedure 500 continues to 510.

Figure 7B:
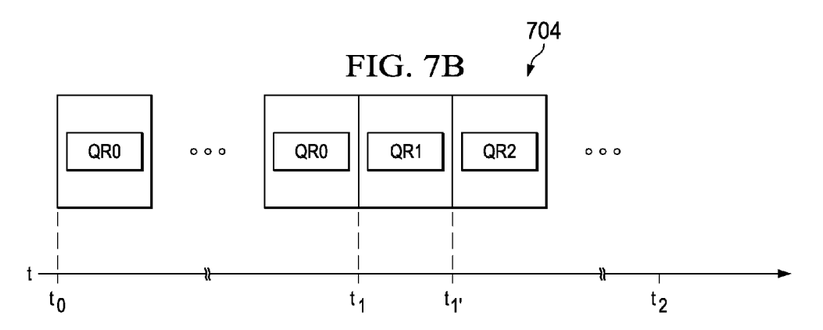
FIG. 7B illustrates an example of a jump in a coded video sequence.

FIG. 7B illustrates an example of a jump in a coded video sequence 704. As can be seen in FIG. 7B, video analyzer 134 of video analyzer device 106 has decoded a coded video sequence 704 having code symbol QR0 embedded in the video frames from time $t_o$ to time $t_1$. At time $t_1$, video accuracy analyzer module 134 decodes code symbol QR1. In the next frame at time $t_1'$, video accuracy analyzer module 134 decodes a code symbol QR2. However, video accuracy analyzer module 134 expected code symbol QR1 to continue until time $t_2$. As a result, video accuracy analyzer module 134 detects a jump in the coded video sequence 704.

Referring again to FIG. 5, in 510, video analyzer device 106 determines whether the end of coded video has been reached. If the end of coded video has not been reached procedure 500 returns to 502 in which additional coded video is received. If the end of coded video has been reached, or alternately if a user indicates that the testing procedure should end, procedure 500 continues to 520.

In 520, video accuracy analyzer module 134 computes an overall video accuracy score for the coded video based upon the detected distortions, jumps, and freezes. In various embodiments, an Overall Video Accuracy (OVA) percentage is calculated using the duration of the failure in each reported category including jump, freeze and distortion according to the following formula:

Overall Video Accuracy(OVA)percentage=100%−
(((Sum[jump]+Sum[freeze]+Sum[distortion])/
total video length)×100%).

An Overall Video Accuracy Score (OVAS) is assigned to the video under test, based on the OVA calculation. A table showing a particular embodiment of a mapping between a Overall Video Accuracy Score (OVAS) and a corresponding calculated Overall Video Accuracy (OVA) percentage is shown as follows:

Overall Video Accuracy Score OVA Percentage
Excellent (1): 99.5-100%
Good (2): 97.0-99.4%
Fair (3): 90-96.9%
Poor (4): 30-89.9%
Extremely Poor (5): 0-29.9%

For example, if the length of the streaming video is 180000 milliseconds (3 minutes) and during the scanning of the streaming video it is reported that total duration of the freeze(s) was 330 ms, the cumulative jump(s) was 1485 ms and total distortion was observed for 231 ms, then the OVA is calculated as 100%−(((330+1485+231)/180000)×100%)=98.87% Accordingly, the Overall Video Accuracy Score is 2 indicative of a "Good" Overall Video Accuracy Score (OVA). Further, in various embodiments statistics are reported on detected freeze/jump/distortion during the video stream analysis. In still other embodiments additional information such as timestamp, duration, and screen captures of any of the three detected issues may also be made available. In 522, procedure 500 ends.

In some embodiments, audio generator module 124 of video source device 102 may be configured to generate a predetermined audio signal, such as a tone, at predetermined intervals and embed the predetermined audio signal along with the coded symbols within one or more frames of the source video in order to track issues that may occur regarding synchronization of audio with the video. Audio detector module 138 of video analyzer device 106 may be configured to detect these predetermined audio signals. If the predetermined audio signals are not detected within the video stream at the predetermined intervals, video analyzer device 106 may determine that the audio and video of the video stream are not in synchronization. However, if the predetermined audio signals are detected at the predetermined intervals and coded symbols, the audio and video synchronization of the video stream are given a passing grade.

For example, a loud sound or beep may be overlaid with QR code #1, and then repeated with QR codes #10, #20, #30, etc. Since the sequence of the code symbols is known, video analyzer device 106 can detect the audio on the other end. In a particular embodiment, the audio is detected using a sound card of a computer. Since it is known that the next beep should occur after the next 10 codes, if the audio is not detected at the next 10 codes, the audio is reported as not being in synchronization with the video. For example, if a beep is detected at the 9th or 11th code, or not detected at all, the audio and video is determined to not be in synchronization.

Traditional objective video quality measurement metrics such as signal-to-noise ratio (SNR) and peak signal-to-noise ratio (PSNR) do not necessarily correlate with end user experience. Tools that measure subjective video quality tend to be heavyweight in nature to implement and hence are not integrated in a production environment measuring imperfections in an end-to-end context. Many existing tools require a substantial amount of extra hardware, software, and large degree of manual involvement.

Compared to the traditional processes, some embodiments described herein may have one or more of the following advantages: In some embodiments, an end user experience of video can be determined as video data is transmitted through various devices in a network. In some embodiments, video latency can be measured and audio/video synchronization can be validated at any segment of a network. In various embodiments, there is a strong correlation between reported issues and actual video imperfections measured by the procedures described herein. In one or more embodiments, the procedures described herein require minimal system overhead as they are cost-effective and lightweight in nature yet are able to detect video imperfections in an end-to-end manner. Some of the embodiments described herein may be easily integrated into production systems or existing products such as servers or switches for in-the-field troubleshooting.

In some embodiments, the term "video accuracy" refers to measuring video imperfections in an end-to-end manner. In various embodiments, such video imperfections may include blocking (pixelization), blurring, early and late video delivery resulting in jerky video, video freezing, and missed, or no video. In addition to "video accuracy", some embodiments may perform validation of the user operations such as play, forward or reverse on live or recorded video. Still other embodiments may measure video latency, detect audio and video synchronization issues, and allow motion and other events to be correlated to video. Some embodiments generate real video on one end of a network to be consumed by a camera and then output video is captured and evaluated as it is displayed on a client side.

Although various embodiments have been described in which the code symbols are QR codes, it should be understood that in other embodiments other code symbols could be used such as bar codes or other matrix codes. Examples of other 2-D matrix codes that could be used in various embodiments include but are not limited to DataGlyphs, mCode, Microsoft Tag, PDF417, DataMatrix, MaxiCode or any other suitable code symbols.

Note that in certain example implementations, the embedding of code symbols in a video stream and determining video accuracy based upon decoding the embedded code symbols outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element [as shown in FIG. 1] can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor [as shown in FIG. 1] could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, video source device 102 and/or video analyzer device 106 may include software in order to achieve the embedding of code symbols in a video stream and determining video accuracy based upon decoding the embedded code symbols functions outlined herein. These activities can be facilitated by source video generator module 112, timing generator module 114, sequence generator module 116, code symbol generator module 118, symbol embedding module 120, video transmission module 122, audio generator module 124, video reception module 130, code symbol decoder module 132, video accuracy analyzer module 134, timing generator module 136, and audio detector module 138 (where these modules can be suitably combined in any appropriate manner, which may be based on particular configuration and/or provisioning needs). Video source device 102 and video analyzer device 106 can include memory elements for storing information to be used in achieving embedding of code symbols in a video stream and determining video accuracy based upon decoding the embedded code symbols activities, as discussed herein. Additionally, video source device 102 and video analyzer device 106 may include a processor that can execute software or an algorithm to perform the embedding of code symbols in a video stream and determining video accuracy based upon decoding the embedded code symbols video operations, as disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the entities, devices, or servers described herein can also include suitable interfaces for receiving, transmitting, and/or otherwise communicating data or information in a network environment.

It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagrams illustrate only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Moreover, although the present disclosure has been described in detail with reference to particular arrangements and configurations, these example configurations and arrangements may be changed significantly without departing from the scope of the present disclosure. Additionally, although communication system 100 has been illustrated with reference to particular elements and operations that facilitate the communication process, these elements and operations may be replaced by any suitable architecture or process that achieves the intended functionality of communication system 100.

What is claimed is:

1. A method using a processor, comprising:
   receiving a video sequence having at least one code symbol embedded therein, the at least one code symbol being selected from a sequence of code symbols;
   determining whether the at least one code symbol is decodable;
   determining one or more video quality parameters based upon whether the at least one symbol is decodable, wherein the video quality parameters include one or more of a duration of distortions in the video sequence, a duration of freezes in the video sequence, and a duration of jumps in the video sequence; and
   determining a video quality metric associated with the video sequence based upon the one or more video quality parameters and a total length of the video sequence;
   wherein determining the video quality metric includes:
      summing the duration of distortions in the video sequence, the duration of freezes in the video sequence, and the duration of jumps in the video sequence; and
      dividing the summation of distortions, freezes, and jumps by the total length of the video sequence.

2. The method of claim 1, wherein determining one or more video quality parameters based upon whether the at least one symbol is decodable includes determining that distortion has occurred in the video sequence if the at least one symbol is not decodable.

3. The method of claim 1, wherein determining whether the at least one code symbol is decodable includes:
   decoding a first code symbol embedded within the video sequence;
   decoding a second code symbol embedded within the video sequence; and
   determining that a freeze has occurred in the video sequence if the first code symbol is the same as the second code symbol and an expected display time of the first code symbol within the sequence of code symbols has been exceeded.

4. The method of claim 1, wherein determining whether the at least one code symbol is decodable includes:
   decoding a first code symbol embedded within the video sequence;
   decoding a second code symbol embedded within the video sequence; and
   determining that a jump has occurred in the video sequence if the first code symbol is different from the second code symbol and the second code symbol is not the expected code symbol within the sequence of code symbols.

5. The method of claim 1, wherein the at least one code symbol is a matrix code symbol.

6. Logic encoded in a non-transitory tangible media that includes code for execution and when executed by a processor operable to perform operations comprising:
   receiving a video sequence having at least one code symbol embedded therein, the at least one code symbol being selected from a sequence of code symbols;
   determining whether the at least one code symbol is decodable, wherein the video quality parameters include one or more of a duration of distortions in the video sequence, a duration of freezes in the video sequence, and a duration of jumps in the video sequence;
   determining one or more video quality parameters based upon whether the at least one symbol is decodable; and
   determining a video quality metric associated with the video sequence based upon the one or more video quality parameters and a total length of the video sequence;
   wherein determining the video quality metric includes:
      summing the duration of distortions in the video sequence, the duration of freezes in the video sequence, and the duration of jumps in the video sequence; and
      dividing the summation of distortions, freezes, and jumps by the total length of the video sequence.

7. The logic of claim 6, wherein determining one or more video quality parameters based upon whether the at least one symbol is decodable includes determining that distortion has occurred in the video sequence if the at least one symbol is not decodable.

8. The logic of claim 6, wherein determining whether the at least one code symbol is decodable includes the operations of:
   decoding a first code symbol embedded within the video sequence;
   decoding a second code symbol embedded within the video sequence; and
   determining that a freeze has occurred in the video sequence if the first code symbol is the same as the second code symbol and an expected display time of the first code symbol within the sequence of code symbols has been exceeded.

9. The logic of claim 6, wherein determining whether the at least one code symbol is decodable includes the operations of:
   decoding a first code symbol embedded within the video sequence;
   decoding a second code symbol embedded within the video sequence; and
   determining that a jump has occurred in the video sequence if the first code symbol is different from the second code symbol and the second code symbol is not the expected code symbol within the sequence of code symbols.

10. The logic of claim 6, wherein the at least one code symbol is a matrix code symbol.

11. An apparatus, comprising:
    a memory element configured to store data;
    a processor operable to execute instructions associated with the data; and
    a video accuracy analyzer module coupled to the processor, the apparatus being configured to:
      receive a video sequence having at least one code symbol embedded therein, the at least one code symbol being selected from a sequence of code symbols;
      determine whether the at least one code symbol is decodable;
      determine one or more video quality parameters based upon whether the at least one symbol is decodable, wherein the video quality parameters include one or more of a duration of distortions in the video sequence, a duration of freezes in the video sequence, and a duration of jumps in the video sequence; and
      determine a video quality metric associated with the video sequence based upon the one or more video quality parameters and a total length of the video sequence;
    wherein in order to determine the video quality metric the apparatus is further configured to:
      sum the duration of distortions in the video sequence, the duration of freezes in the video sequence, and the duration of jumps in the video sequence; and
      divide the summation of distortions, freezes, and jumps by the total length of the video sequence.

12. The apparatus of claim 11, wherein in order to determine one or more video quality parameters based upon whether the at least one symbol is decodable the apparatus is further configurable to determine that distortion has occurred in the video sequence if the at least one symbol is not decodable.

13. The apparatus of claim 11, wherein in order to determine whether the at least one code symbol is decodable the apparatus is further configurable to:
    decode a first code symbol embedded within the video sequence;
    decode a second code symbol embedded within the video sequence; and
    determine that a freeze has occurred in the video sequence if the first code symbol is the same as the second code symbol and an expected display time of the first code symbol within the sequence of code symbols has been exceeded.

14. The apparatus of claim 11, wherein in order to determine whether the at least one code symbol is decodable the apparatus is further configurable to:
    decode a first code symbol embedded within the video sequence;
    decode a second code symbol embedded within the video sequence; and
    determine that a jump has occurred in the video sequence if the first code symbol is different from the second code symbol and the second code symbol is not the expected code symbol within the sequence of code symbols.

15. The apparatus of claim 11, wherein the at least one code symbol is a matrix code symbol.

* * * * *